(12) United States Patent
Li et al.

(10) Patent No.: US 8,484,231 B2
(45) Date of Patent: Jul. 9, 2013

(54) SYSTEM AND METHOD FOR DATA MAPPING AND INFORMATION SHARING

(75) Inventors: Cheng Jun Li, Beijing (CN); Henry Chen, Beijing (CN); Jian Geng Du, Beijing (CN); Conrad Bruce Beaulieu, Duluth, MN (US)

(73) Assignee: Honeywell International Inc., Morristown, NJ (US)

( * ) Notice: Subject to any disclaimer, the term of this patent is extended or adjusted under 35 U.S.C. 154(b) by 88 days.

(21) Appl. No.: 12/914,184

(22) Filed: Oct. 28, 2010

(65) Prior Publication Data

US 2012/0109988 A1 May 3, 2012

(51) Int. Cl.
*G06F 17/30* (2006.01)

(52) U.S. Cl.
USPC .......................................... 707/756; 715/727

(58) Field of Classification Search
USPC ................................... 707/756, 803; 715/727
See application file for complete search history.

(56) References Cited

U.S. PATENT DOCUMENTS

| 7,840,610 | B2* | 11/2010 | Chandrasekharan et al. | 707/809 |
|---|---|---|---|---|
| 2008/0040669 | A1* | 2/2008 | Plocher et al. ................. | 715/727 |
| 2008/0082183 | A1 | 4/2008 | Judge | |
| 2008/0157984 | A1* | 7/2008 | Li et al. .......................... | 340/584 |
| 2008/0177423 | A1 | 7/2008 | Brickfield et al. | |
| 2008/0186201 | A1 | 8/2008 | Wang et al. | |
| 2008/0243657 | A1 | 10/2008 | Voysey | |
| 2008/0248450 | A1 | 10/2008 | Li et al. | |
| 2008/0250265 | A1 | 10/2008 | Chang et al. | |
| 2008/0255899 | A1 | 10/2008 | McConnell et al. | |
| 2009/0138306 | A1 | 5/2009 | Coburn et al. | |
| 2010/0057354 | A1 | 3/2010 | Chen et al. | |
| 2010/0102983 | A1 | 4/2010 | Plocher et al. | |
| 2011/0218777 | A1 | 9/2011 | Chen et al. | |

FOREIGN PATENT DOCUMENTS

| EP | 1494150 A2 | 1/2005 |
|---|---|---|
| JP | 2007-140736 A | 6/2007 |
| WO | WO-2007/093060 A1 | 8/2007 |
| WO | WO-2008124185 A1 | 10/2008 |

OTHER PUBLICATIONS

Machine translated Korean Patent Application Publication 2010/0124558, published on Nov. 29, 2010; pp. 1-7.*

(Continued)

*Primary Examiner* — Monica Pyo
(74) *Attorney, Agent, or Firm* — Schwegman, Lundberg & Woessner, P.A.

(57) ABSTRACT

A process includes mapping a data format in an object in a source schema to a data format in an object in a destination schema. The process includes defining an attribute mapping, defining a relation between the data format in the object in the source and the data format in the object in the destination, mapping the data format in the object in the source to the data format in the object in the destination, and converting the data format in the object in the source to another data format within the source. When the object in the source has no analog in destination, a foreign object is introduced into the destination, and when the object in the destination refers to one or more dependent objects, one or more instances of referred objects are generated according to a predefined policy in the mapping.

14 Claims, 6 Drawing Sheets

OTHER PUBLICATIONS

"National BIM Standard™", [online]. [archived Jun. 8, 2008]. Retrieved from the Internet: <URL: http://replay.waybackmachine.org/20080608151506/http://www.facilityinformationcouncil.org/bim/>, (2008), 2 pgs.

Duce, D. A, et al., "The Significant Properties of Vector Images", JISC/BL/DPC workshop, Sig Props Workshop on the Significant Properties of Digital Objects, *British Library*, (Apr. 7, 2008), 38 pgs.

Nivasch, G., "Cycle detection using a stack", *Information Processing Letters*, 90(3), (May 16, 2004), 135-140.

Shotton, J., et al., "Multiscale Categorical Object Recognition Using Contour Fragments", *IEEE Transactions on Pattern Analysis and Machine Intelligence*, 30(7), (2008), 1270-1281.

Takahiro, H., et al., "Object Extraction for Vector Images with primitive Selection Model", *Transactions of Information Processing Society of Japan*, 48(3), (2008), 1154-1165.

\* cited by examiner

SYSTEM AND METHOD FOR DATA MAPPING AND INFORMATION SHARING

TECHNICAL FIELD

The present disclosure relates to the exchange of data between different software applications, and in an embodiment, but not by way of limitation, to a system and method for data mapping and information sharing.

BACKGROUND

As the number of commercial and custom software applications continues to increase, there are increasing benefits to being able to share data between multiple software applications. This allows users of one of the software applications to view and modify files created by other applications. It can also be useful for different applications to be able to share data when they use the same types of data for different purposes or use the data of the other application type to supplement the data to which they have access.

In many industry domains, organizations use common standards. To conform to an evolving standard, users typically need to continuously modify their applications and databases, which are inordinate tasks. To complicate the matter further, when the standard changes, it is frequently necessary to alter user applications and convert associated databases to accommodate new features. Thus, the latest available standard can be cumbersome and expensive to implement and use, and it may not meet the needs of the broad community of users. Because the standard dictates the types of transactions that can be implemented through electronic data transfer, it may severely limit business practices.

Accordingly, there is a need for a system and method of sharing information among diverse applications that are based on an evolving standard which is readily adaptable to changing commercial environments. Also, there is a need for a system that does not require complex, time consuming, and error-prone modifications of existing applications and databases in order to facilitate information sharing. Furthermore, there is a need for one or more standards and associated methods and systems that can be readily adapted by a broad community of users who desire to share information.

DETAILED DESCRIPTION

Figure 1:
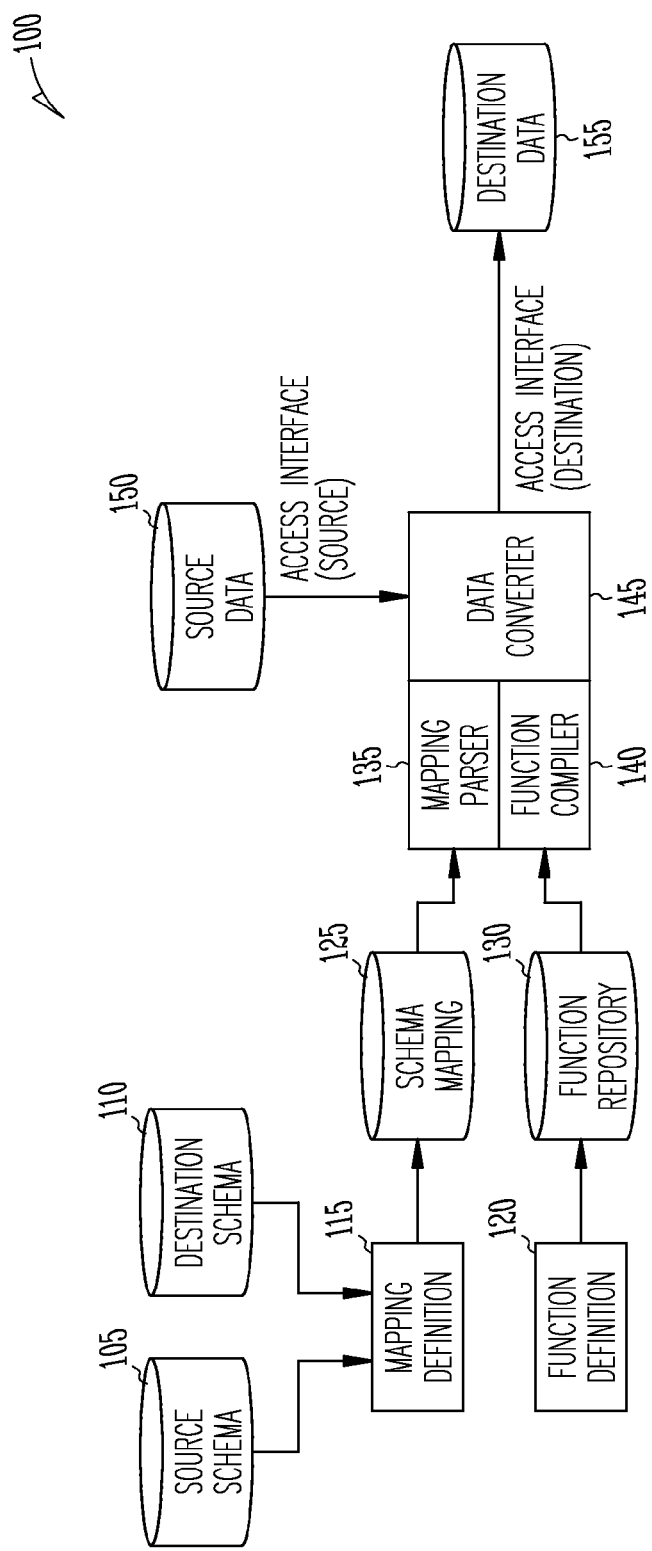
FIG. 1 is a block diagram of an example embodiment of a system for data mapping and sharing of information.

Data can be represented or defined in different ways. The definition can include meta-data that adds semantic meaning to the data and enriches it to become information. Data can be encapsulated with other data as properties or attributes of objects, objects can contain relations between objects, and the objects can contain operations or methods that can be taken upon the encapsulated data. Through corresponding access methods, data can be created, deleted, retrieved, and updated with various representations. For example, a person usually has a name, a phone number, and an address. This information can be recorded in database tables, in formatted text files, or simply on a business card. Different definitions and representations present a formidable obstacle to integrating data creating information. Even in similar domains, the data definitions may vary because applications have been written with variant data representations.

These different data definitions and representations are particularly pronounced in certain industries. For example, an Industry Foundation Classes (IFC) specification is a neutral data format to describe and share information typically used within the building and facility management industry sector. The IFC data model focuses on those classes that are needed to share information (rather than processing it in proprietary software). The IFC is registered by ISO as ISO/PAS16739, and it is currently in the process of becoming an official International Standard ISO/IS16739. In order to follow this standard in the context of the building information model BIM, data sharing is necessary between application specific data and the IFC representation. Although EXPRESS (ISO 10303-11) is the basic representation of IFC, and it is convenient to transfer EXPRESS compatible data from one application to another, this still requires a conversion since few applications directly use EXPRESS as their data structures. As an example of application specific data representation and IFC data representation, the following Table 1 lists three example definitions of a point type.

TABLE 1

Samples of point definition.

| Def.1: Point | Def.2: Point3d | Def.3: IfcCartesianPoint |
|---|---|---|
| Integer X; | Double X; | Coordinates : LIST [1:3] |
| Integer Y; | Double Y; | OF IfcLengthMeasure; |
| | Double Z; | |

One or more embodiments relate to transferring data from one computer application to another, especially with different data formats. These embodiments provide a novel method and apparatus for readily and effectively converting data from one representation to another. In other words, given two data representations together with their access interfaces, the method can convert the data represented in the source schema (Ss) to those in the destination schema (Sd). The data transfer may involve an information rich transformation.

In an embodiment, the method contains three modules—a mapping definition module, a function definition module, and a data conversion module. One or more computer processors are configured to execute these modules. The mapping definition module contains object mapping, attribute mapping, and relation definitions. The mapping definition module receives two schemas as input, and it outputs mapping data. The function definition module supports scripts that translate data in one representation into other representations in cases of complex transformations. The data conversion module converts data represented in a source schema to corresponding data represented in a destination schema through the access interfaces of the schemas. The access interfaces include methods of creating, deleting, retrieving, and updating objects. The access interfaces contain a mapping parser sub-module and a function compiler sub-module that retrieve mapping data and function definition data respectively.

One or more embodiments do not need to change the current data structure and model representation used and/or owned by different applications. These embodiments apply to any schemas and the representations of these schemas. These embodiments can be readily modified when the source schema, the destination schema, or both change.

FIG. 1 illustrates an example embodiment of a system 100 that can be used to convert a source schema 105 into a destination schema 110. The system 100 includes a mapping definition module 115, which receives input from the source schema 105 and the destination schema 110, and generates a schema mapping 125. A function definition module 120 generates a function repository 130. The schema mapping 125 serves as input to a mapping parser 135, and the function repository 130 serves as input to a function compiler 140. Source data 150 is provided as input to a data converter module 145, which converts the data into the destination data 155. A more detailed explanation of this system and process are provided below.

Figure 2:
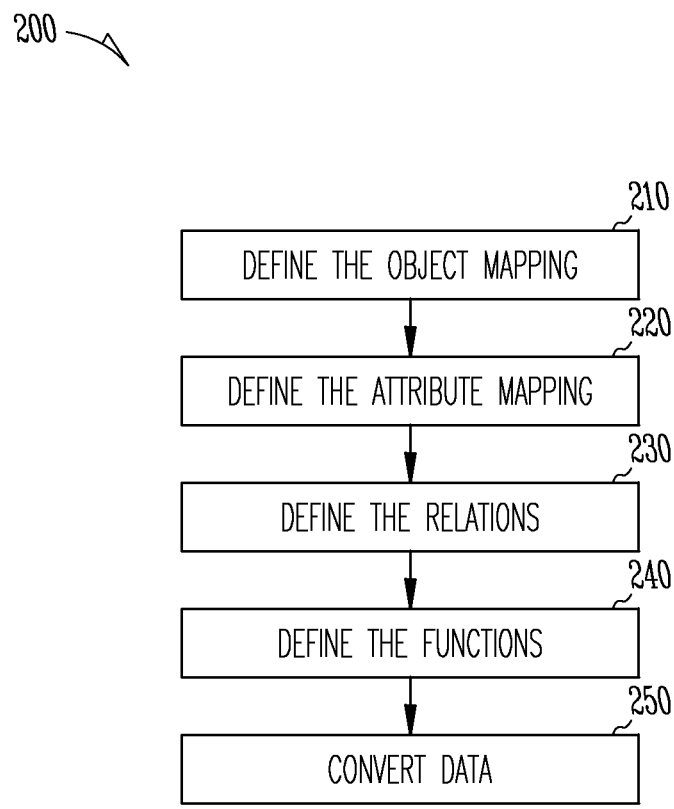
FIG. 2 is a flowchart of an example process of data mapping and sharing of information.

FIG. 2 illustrates a high level process 200 that can be executed in the system 100 of FIG. 1. At 210, the object mapping is defined. At 220, the attribute mapping is defined. At 230, the relations are defined, and at 240, the functions are defined. Then, after the execution of steps 210-240, the source data is converted into the destination data at 250.

More specifically, in defining the object mapping at 210, the object mapping relates objects from two model schemas, such as source schema 105 and destination schema 110. It consists of a set of <S∈Ss, D∈Sd> pairs where S is an object of Ss and D is an object of Sd. The S object will be translated to the D object in the converting step (250). There are four cases comprising object mapping.

In the first case, the object in the source schema has exactly one analog in the destination schema. In practice, this is quite common since the mapping is usually created between two similar schemas. If an object is abstract, it cannot be instantiated and furthermore it cannot be recorded as data. So, the mapping for an abstract object will be cast down to mappings between the derived types. For example, if 'Curve' is an abstract object in a source schema, there may never be an instance of 'Curve' when the data is recorded. It therefore cannot be mapped directly into the corresponding 'Curve' object in the destination schema. Instead, its derived objects such as 'Line,' 'Circle,' and 'Rectangle' will be mapped. It depends on the two class hierarchies in the source and destination schemas. All the concrete types are mapped.

In the second case, either the object in the source schema or the object in the destination schema has more than one analog, that is, the mapping in-between is many-to-many. For example, a 'Vector3' may be mapped to 'Vector', 'Point', 'Direction' or 'Normal'. On the other hand, 'Rectangle' and 'Box' may both be mapped to 'BoundingBox'. Each pair of possible mapping matches will be recorded as a mapping entry. When converting data, the source and destination types determine which entry is applicable.

In the third case, the object in the source schema has no analog in destination schema. The object is then translated through functions to another type of object or objects so that the new source object can be mapped. If there is no proper type for the translation, a foreign object can be introduced into the destination schema. The instances of these objects in source data can simply be copied to destination data or additional data. Thereafter, the destination data can be translated back into the source data without losing any data.

In the fourth case, the object in the destination schema has no analog in the source schema. The source schema and the destination schema are relative to each other. So similar to the third case, a foreign object can be introduced in the source schema. The instances of these objects in destination data can be simply copied to source data or to additional data. The source data can later be translated back into the destination data without losing any data. However, the difference is that the object in the destination may refer to other objects, whose counterpart is not defined in the source schema. In that case, the referred object in destination schema will be generated according to the predefined policy in the mapping. For example, the IfcBuilding object in the destination schema refers to the IfcGloballyUniqueld object, but the source schema does not have the counterpart for the IfcGloballyUniqueld. So when the Building object in the source schema is mapped into the IfcBuilding in the destination schema, the instance of IfcGloballyUniqueld will be generated according to some predefined policy—a function generating the GUID.

According to the definitions of source schema and destination schema, the attribute mapping 220 can be classified into several categories. The mapping values, expressions, and functions are stored with the object mapping. Each mapping entry is denoted as <E(S),A>, where A is an attribute of D and E(S) is a composed expression of constant values, methods, and evaluations of S and its attributes. The several categories of the attribute mapping 220 can include an optional value (or an optional value set), a constant value (or a constant value set), an independent value (that means that the attribute has no relationship with specific objects), a simple value (a number, string, logical value, or an enumeration), an entity value (a composite object that consists of simple values and other entity values), and a specific query (with or without parameters). For example a concrete type can be assigned so that it matches the attribute, and then uses the entity value or simple value mapping above. For example, assign a 'Circle' to a 'Curve' if this is the right mapping or use the abstract object mapping.

In defining the relations at 230, a relation relates two objects in a schema. The relations between objects can include containing, connecting, sequencing, aggregating, and associating. These relations can be implicit or explicit. For example, a 'Building' includes 'Stories' and 'Stories' include 'Walls' and 'Columns.' In the source schema, the relation can be implicit because its data is organized as a hierarchical structure—that is, 'Building' is the parent of 'Stories' and 'Stories' is the parent of 'Walls' and 'Columns.' However, in the destination schema, the relation is explicit and there is a concrete object to represent these relations. For the above example, the object 'IFCRELAGGREGATES' defines a relation that a building has some stories, and the object IFCREL-SONTAINEDINSPATIALSTRUCTURE defines the relation that a storey has some walls and columns. Therefore, it is necessary to map the implicit relation in the source schema into a concrete object in the destination schema to explicitly represent these relations.

Figure 3:
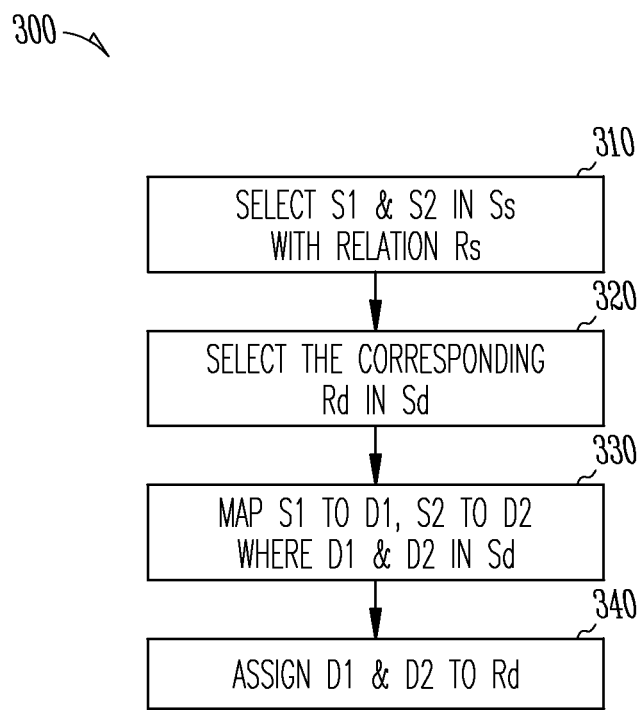
FIG. 3 is a flowchart of another example process of data mapping and sharing of information.

For example, referring to process 300 in FIG. 3, consider two types of objects S1 and S2 in Ss with the relation Rs at 310. Then, at 320, select the corresponding relation Rd in Sd. At 330, find the mapping <S1, D1> and <S2, D2>, where D1 and D2 are in Sd, then at 340, assign D1 and D2 to Rd according to its definition. For example, 'Building' and 'Storey' are assigned to an 'Aggregate' relation with 'RelatingObject' is 'Building' and 'RelatedObject' is 'Storey'.

When defining the functions at 240, not all the attributes can be matched directly through mapping. In such situations, calculations are then needed. A function is a script or code module that encodes a process that converts data represented in Ss to other data in Sd so that they can support the mapping from Ss to Sd, including object mapping and attribute mapping. For example, a rotation represented by Quaternion needs to be translated to three perpendicular axes in other representations. The calculation is customized. A function has its name, parameters and returns. They are stored in the function repository.

The final step at 250 is to convert all the data into a specified representation. This final step is illustrated in more detail in process 400 in FIG. 4. At 405, given an object S represented in source schema Ss, at 410, find a mapping entry <S, D> in the defined mapping store by the mapping parser. If no proper mapping is found at 415, the process terminates at 420. With the access interface of destination schema Sd, an empty object in D is created at 425. For all of its attributes defined in Sd, at 430, find the corresponding attribute mapping entry <E(S), A>, where A is an attribute of D, E(S) is an expression of S. At 435, evaluate E(S) with the access interface of Ss and function compiler if needed, then use the methods listed in "Define the attribute mapping" to assign the value to the attribute A at 440. The procedure iterates until all the attributes of D are set (445, 450).

Figure 4:
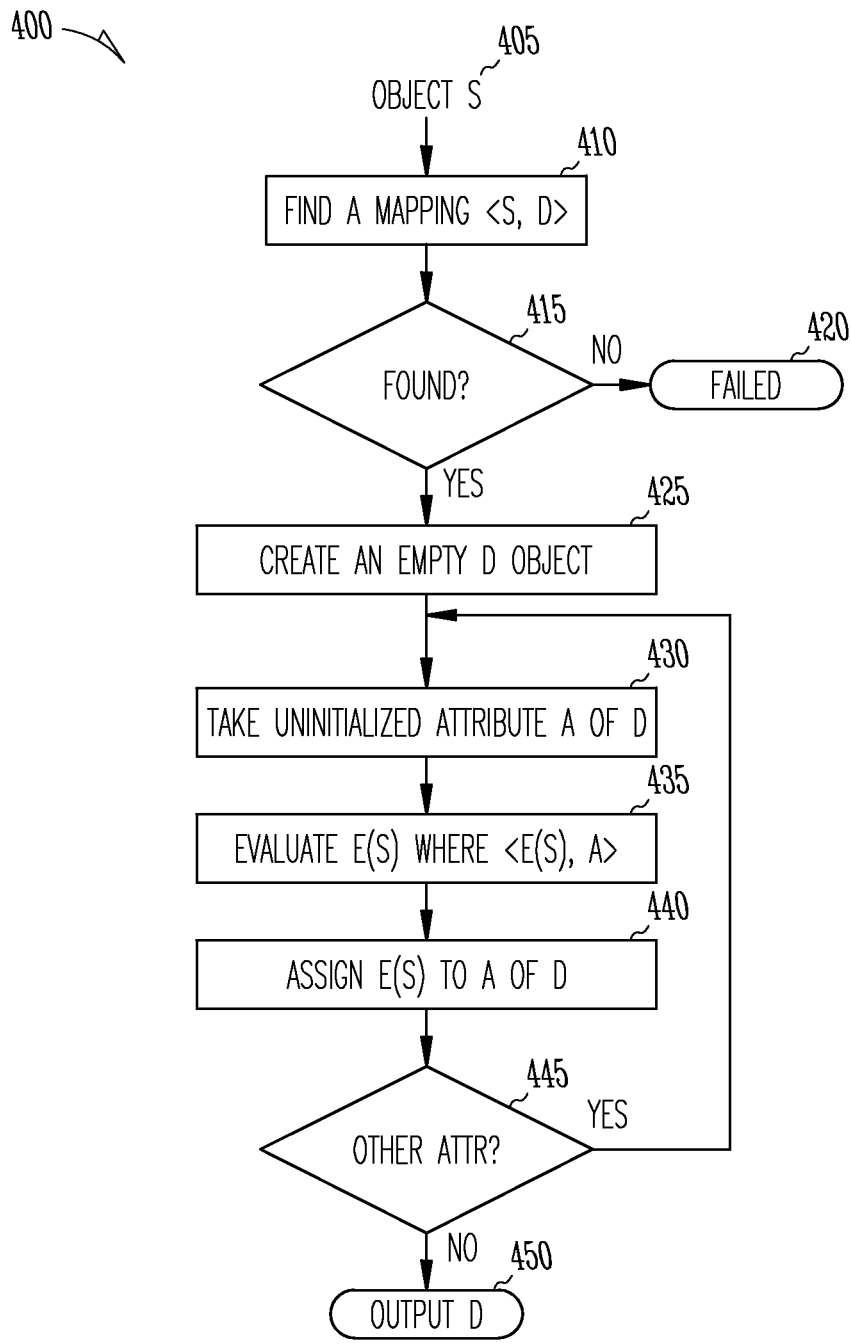
FIG. 4 is a flowchart of another example process of data mapping and sharing of information.
Figure 5:
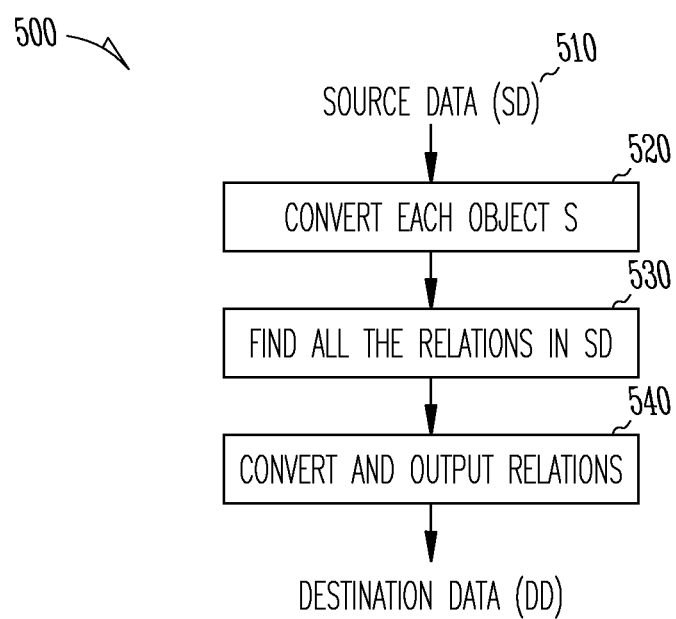
FIG. 5 is a flowchart of another example process of data mapping and sharing of information.

Whereas FIG. 4 illustrates an example process 400 to convert an object, FIG. 5 illustrates a process 500 to convert all of the data. Specifically, source data 510 is provided, and at 520, the encapsulated data of each object S is converted. Then, at 530, all the relations in Sd are found, and at 540, the conversion is executed and the relations are output.

Figure 6:
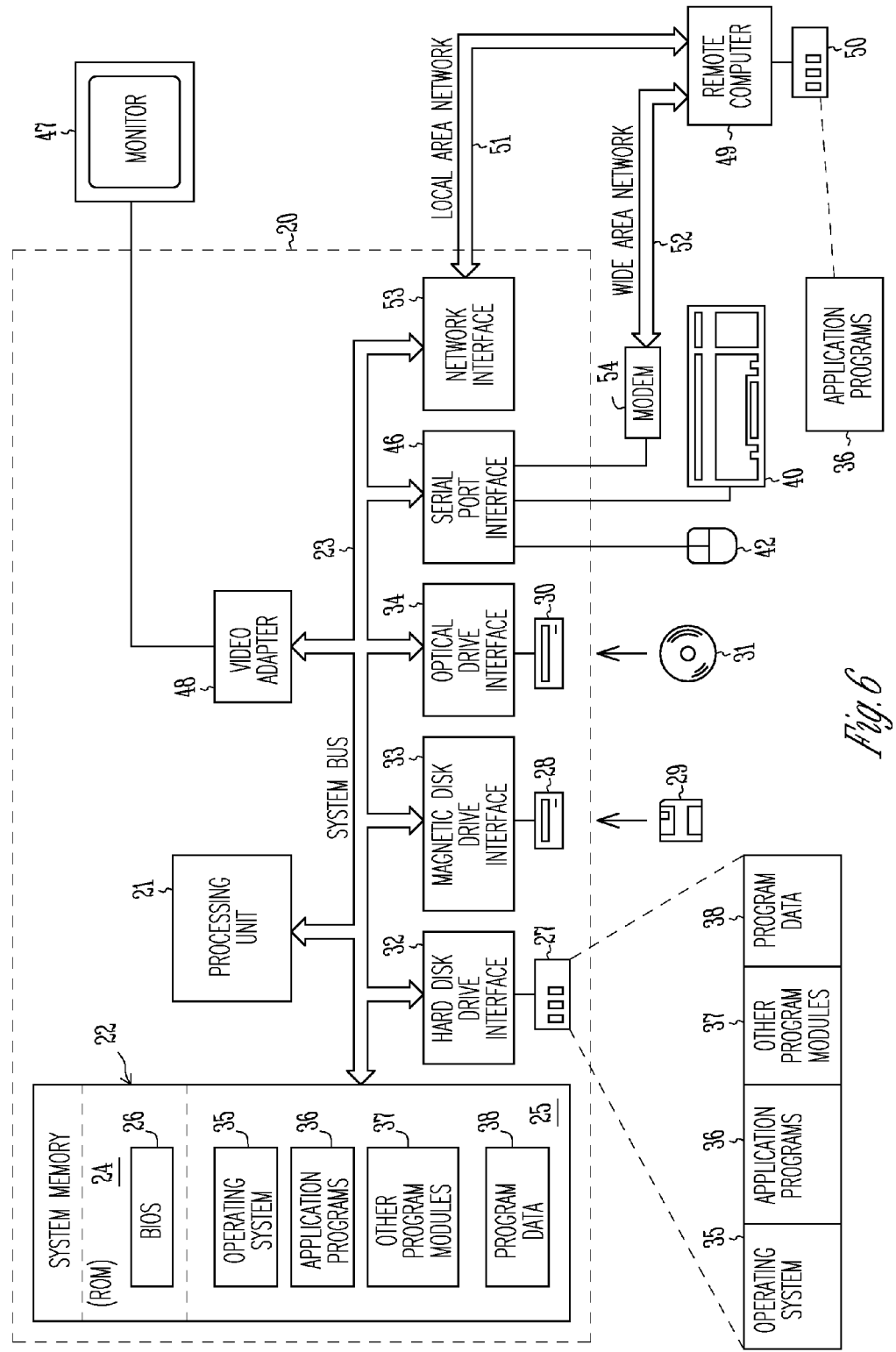
FIG. 6 is a block diagram of a computer system upon which one or more embodiments of the present disclosure can operate.

FIG. 6 is an overview diagram of a hardware and operating environment in conjunction with which embodiments of the invention may be practiced. The description of FIG. 6 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 6 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

The invention claimed is:

1. A process comprising:
   mapping a data format in an object in a source schema to a data format in an object in a destination schema, wherein the mapping comprises a set of options comprising the data format in the object in the source schema has exactly one analog in the data in the destination schema, the data format in the object in the source schema has more than one analog, the data format in the object in the destination schema has more than one analog, the data format in the object in the source schema has no analog in the destination schema, and the data format in the object in the destination schema has no analog in the source schema;
   defining an attribute mapping, the attribute mapping comprising a set of value options comprising an optional value, a constant value, an independent value, a simple value, an entity value, a specific query, and an assigned value;
   wherein the independent value comprises an attribute that has no relationship with a specific object, the simple value comprises a number, a string, a logical value, and an enumeration, and the entity value comprises a composite object including simple values and other entity values;
   defining a relation between the data format in the object in the source schema and the data format in the object in the destination schema;
   mapping the data format in the object in the source schema to the data format in the object in the destination schema;
   when the object in the source schema has no analog in destination schema, introducing a foreign object into the destination schema;
   when the object in the destination schema refers to one or more dependent objects, wherein a counterpart is not defined in the source schema, generating one or more instances of referred objects according to a predefined policy in the mapping; and
   converting data in the object in the source schema to the data format in the object of the destination schema;
   wherein the data format in the object in the source schema and the data format in the object in the destination schema comprise Industry Foundation Classes (IFC) and building information modeling (BIM); and
   wherein the data format in the object in the source schema and the data format in the object in the destination schema comprise ISO/PAS 16739 (Industry Foundation Classes) and OmniClass™.

2. The process of claim 1, wherein the attribute mapping is associated and stored with the object mapping.

3. The process of claim 1, wherein an implicit relation between an object in the source schema is mapped into a concrete object in the destination schema to represent an explicit relation.

4. The process of claim 1, comprising mapping an abstract object based on a mapping of one or more derived types of the abstract object.

5. The process of claim 1, comprising converting the data format in the object in the source schema to another data format within the source schema.

6. A non-transitory computer readable medium comprising instructions that when executed by a processor execute a process comprising:
   mapping a data format in an object in a source schema to a data format in an object in a destination schema, wherein the mapping comprises a set of options comprising the data format in the object in the source schema has exactly one analog in the data in the destination schema, the data format in the object in the source schema has more than one analog, the data format in the object in the destination schema has more than one analog, the data format in the object in the source schema has no analog in the destination schema, and the data format in the object in the destination schema has no analog in the source schema;
   defining an attribute mapping, the attribute mapping comprising a set of value options comprising an optional value, a constant value, an independent value, a simple value, an entity value, a specific query, and an assigned value;
   wherein the independent value comprises an attribute that has no relationship with a specific object, the simple value comprises a number, a string, a logical value, and an enumeration, and the entity value comprises a composite object including simple values and other entity values;
   defining a relation between the data format in the object in the source schema and the data format in the object in the destination schema;
   mapping the data format in the object in the source schema to the data format in the object in the destination schema;
   when the object in the source schema has no analog in destination schema, introducing a foreign object into the destination schema;

when the object in the destination schema refers to one or more dependent objects, wherein a counterpart is not defined in the source schema, generating one or more instances of referred objects according to a predefined policy in the mapping; and converting data in the object in the source schema to the data format in the object of the destination schema;

wherein the data format in the object in the source schema and the data format in the object in the destination schema comprise one or more of Industry Foundation Classes (IFC) and building information modeling (BIM)); and wherein the data format in the object in the source schema and the data format in the object in the destination schema comprise ISO/PAS 16739 (Industry Foundation Classes) and OmniClass™.

7. The non-transitory computer readable medium of claim 6, wherein the attribute mapping is associated and stored with the object mapping.

8. The non-transitory computer readable medium of claim 6, wherein an implicit relation between an object in the source schema is mapped into a concrete object in the destination schema to represent an explicit relation.

9. The non-transitory computer readable medium of claim 6, comprising instructions for mapping an abstract object based on a mapping of one or more derived types of the abstract object.

10. The non-transitory computer readable medium of claim 6, comprising instructions for converting the data format in the object in the source schema to another data format within the source schema.

11. A system comprising:
one or more computer processors configured for:
mapping a data format in an object in a source schema to a data format in an object in a destination schema, wherein the mapping comprises a set of options comprising the data format in the object in the source schema has exactly one analog in the data in the destination schema, the data format in the object in the source schema has more than one analog, the data format in the object in the destination schema has more than one analog, the data format in the object in the source schema has no analog in the destination schema, and the data format in the object in the destination schema has no analog in the source schema;
defining an attribute mapping, the attribute mapping comprising a set of value options comprising an optional value, a constant value, an independent value, a simple value, an entity value, a specific query, and an assigned value;
wherein the independent value comprises an attribute that has no relationship with a specific object, the simple value comprises a number, a string, a logical value, and an enumeration, and the entity value comprises a composite object including simple values and other entity values;
defining a relation between the data format in the object in the source schema and the data format in the object in the destination schema;
mapping the data format in the object in the source schema to the data format in the object in the destination schema;
when the object in the source schema has no analog in destination schema, introducing a foreign object into the destination schema;
when the object in the destination schema refers to one or more dependent objects, wherein a counterpart is not defined in the source schema, generating one or more instances of referred objects according to a predefined policy in the mapping; and
converting data in the object in the source schema to the data format in the object of the destination schema;
wherein the data format in the object in the source schema and the data format in the object in the destination schema comprise Industry Foundation Classes (IFC) and building information modeling (BIM)); and
wherein the data format in the object in the source schema and the data format in the object in the destination schema comprise ISO/PAS 16739 (Industry Foundation Classes) and OmniClass™.

12. The system of claim 11, wherein the attribute mapping is associated and stored with the object mapping; and wherein an implicit relation between an object in the source schema is mapped into a concrete object in the destination schema to represent an explicit relation.

13. The system of claim 11, comprising a computer processor configured for mapping an abstract object based on a mapping of one or more derived types of the abstract object.

14. The system of claim 11, comprising a computer processor configured for converting the data format in the object in the source schema to another data format within the source schema.

* * * * *